June 25, 1968    B. C. HARBERT    3,389,598
LOAD FAILURE DETECTOR DEVICE
Filed March 28, 1966

INVENTOR.
BOBBY C. HARBERT
By
Stuart W. Wohlgemuth
ATTORNEY

3,389,598
LOAD FAILURE DETECTOR DEVICE
Bobby C. Harbert, Waco, Tex., assignor to North American Rockwell Corporation, a corporation of Delaware
Filed Mar. 28, 1966, Ser. No. 537,822
6 Claims. (Cl. 73—88.5)

This invention relates to a device for the characterization of some of the mechanical and physical properties of single or multilayer viscoelastic materials.

To date, knowledge of the mechanical properties of viscoelastic materials such as rubbers, solid propellants and plastics under combined stress fields is inadequate. Properties which have been obtained in uniaxial or single stress tests are normally used in design equations which involve combined stresses, knowing that these uni-axial properties are not those for the materials under a given combined stress. As can be appreciated without determining what the actual properties are, the designer who wishes to use the material is at a great disadvantage. As a result, various test techniques have been developed for subjecting material test specimens to combined stresses, depending upon the combination desired, such as tension-tension-tension, or compression-tension-tension or tension-compression and the like. In the field of solid propellants one of the more important combinations is tension-tension-tension; because this type of loading is imposed upon the propellant and the propellant to liner bond at the case wall as the propellant cools down from the cured temperature and (or) undergoes further load cycling. This combined load is recognized as one of the most important areas from the standpoint of being able to design a totally reliable solid rocket engine.

One of the most promising methods for determining the stress problems in the solid propellant is utilizing the poker chip test. This test is set forth in the Interagency Chemical Rocket Propulsion Group, Solid Propellant Mechanical Behavior Manual, Sections 4.55 and 4.73. In this test thin discs of the single or multilayered viscoelastic materials are cast and cured in place or bonded between two parallel flat rigid circular plates by means of suitable adhesive. The plates are pulled apart in a direction perpendicular to the surface of the plates on an appropriate materials tester such as an Instron tester. The stress and strain values in the test specimens during the pull are variable; however, the theoretical stress analysis such as earlier referred to, predicts what these values should be. There are several of these analyses available for the poker chip and are well known in the art.

The results of the tests performed using this invention serve to confirm the theoretical analysis as well as identify the initial failure point in the specimen. Detection of the initial failure point in the test has been difficult because it occurs in the center of the specimen and is obscured by the surrounding material under test, which has not yet been pulled apart. For many materials, such as solid propellants, the initial failure point is extremely minute. Prior to the herein invention, sonic transducers have been used to detect the initial failures in the materials during the triaxial test. However, for a substance such as solid propellants this technique is not successful. Because of the very small initial failure point and due to the fact that the failure occurs over a finite time period depending on strain rate and test temperature, the energy released is not detectable in the form of a noise.

Thus an object of this invention is to provide a device for the detection of initial failures in materials subjected to triaxial tension.

Another object of this invention is to provide a device which will serve to confirm various theoretical stress analyses for any combination of materials desired and subjected to triaxial tension.

One further object of the invention is to provide a device which can be used to measure the magnitude of loads imposed by other means such as shrinkage during cure of a cast and cured-in-place poker chip specimen.

The above and other objects of the invention are accomplished by the load failure detector device which is a steel load disc for use in cooperation with conventional steel poker chip platens. In the poker chip test, a circular disc sample of the material or materials to be tested is fixed between two steel platens. The platens are then pulled in opposite directions axially at the desired rate and temperature so as to place load upon the poker chip sample therebetween. Initial failure occurs at the center of the specimen when the stress in the specimen reaches the ultimate tensile strength of the material in triaxial tension. For this reason the load detector device of this invention is disposed in the center of one of the steel platens. The load detector has a cantilevered flat load disc for contact with the surface of the specimen tested. A shaft is affixed to the disc and extends axially away from the specimen. This shaft serves as the load strain element and thus strain gages or other strain sensing devices can be mounted in various configurations to monitor the strain element. The strain gages are mounted in a conventional strain gage bridge where all gages act as active arms inasmuch as two of the gages are mounted in the hoop direction and two in the longitudinal direction along the cylindrical shaft. This configuration gives a higher output due to the fact that lateral strain in the hoop direction occurs with the applied longitudinal load and this strain is additive in each leg of the bridge giving more output than would be experienced with a two arm bridge. The configuration still gives good temperature compensation in the bridge output. The load detector device of the invention thus detects the load over a very small area at the center of the test specimen. When failure occurs at the center it is normally so small that it does not affect the overall specimen load notably as indicated by the overall load on the Instron tester. It is believed the invention will be better understood from the following detailed drawings in which:

Figure 1:
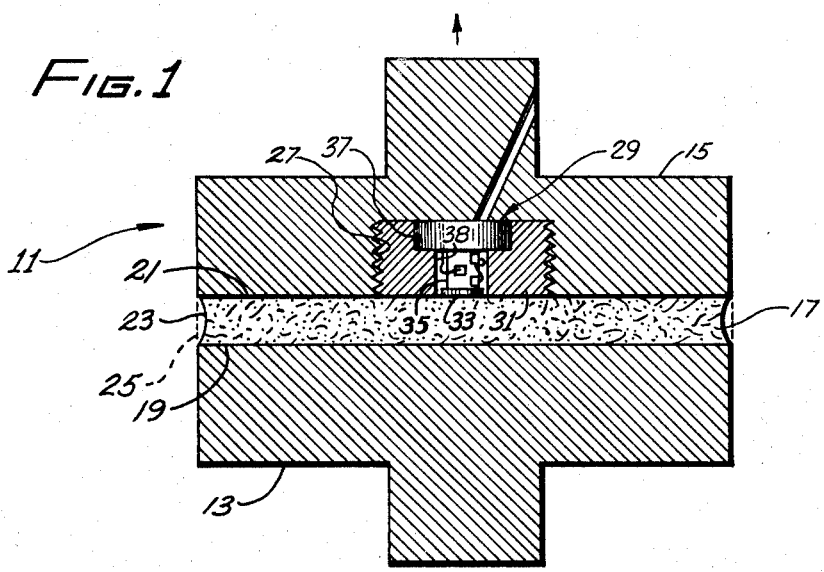
FIG. 1 is a cross-sectional pictorial representation of the steel platens, test specimen, and load detector device of the invention.

Referring to FIG. 1 the load failure detector device is shown incorporated into a steel poker chip platen 11. A second plain steel platen 13 is shown on the bottom of the assembly. Disposed between the platens is a specimen 17 which is bonded or cast in place to the flat surfaces 19 and 21 respectively. As can be seen the specimen at its outer periphery 23 is curved inwardly indicating a loaded condition with a dotted line 25 indicating the position prior to loading. The platen and specimen assembly are normally inserted in a conventional testing device such as an Instron material tester. A pull is exerted on the platens in the direction indicated by the arrows and thus a load is imposed on the specimen 17. The body of load failure detector device is comprised of a poker chip platen 15 which has been provided with a threaded cavity 27 at the center thereof and adjacent to surface 21. Disposed in the cavity is the load strain element 29 with appropriate strain sensing devices mounted in a conventional bridge circuit. This element is held in place by a retainer plus ring 31 which is match threaded with the platen 15.

Figure 2:
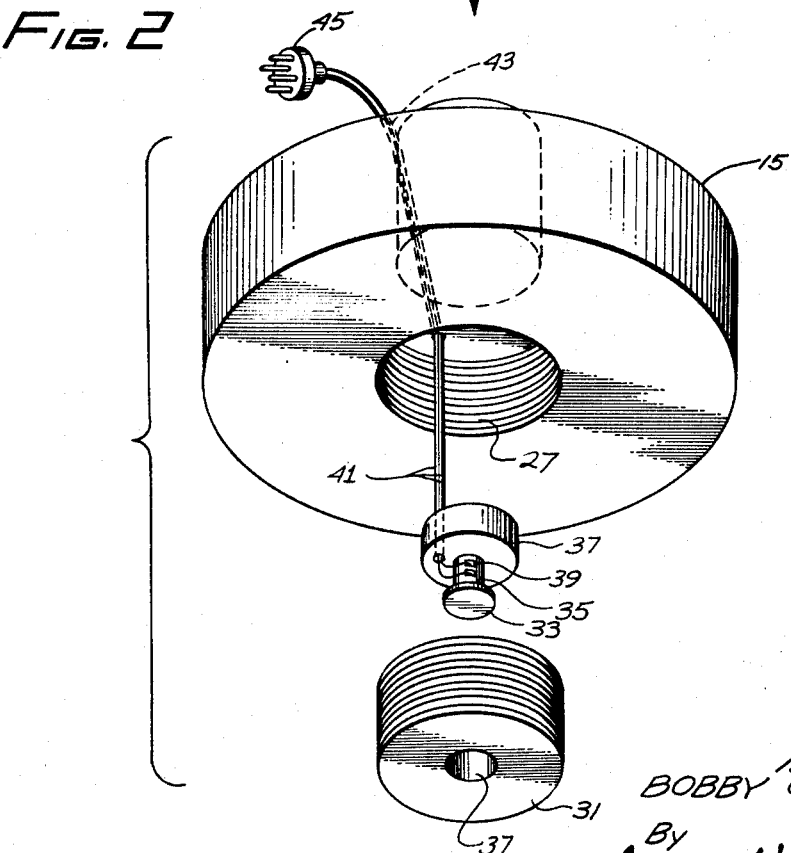
FIG. 2 is an exploded pictorial representation of the load detector device of the invention.

The description of the device 29 of the invention will be better understood with reference to FIG. 2 in conjunction with FIG. 1. The device 29 comprises a metal load disc 33 which is disposed flush with surface 21 of the platen 15 when the threaded retainer plug is tightened up. A shaft 35 is affixed to the back of the disc 33 and connects the load disc to a mounting apron 37. It is also possible to make the disc-shaft-apron all of one piece. The load detecting device 29 is disposed within a bore 38 in the retainer plug 31. The diameter of the bore 37 at the surface 21 of the platen is slightly larger than the diameter of the load disc 33 so that the disc is free to move with respect to the plug 31 in the area of the specimen 17. The bore 38 is countersunk at the opposite end of the plug from the load disc so as to exactly accommodate the rear mounting apron 37. Thus, when the retainer ring 31 is tightly screwed in the cavity 27 of the platen, the load sensing element is rigidly held in place at the end opposite the disc and the load disc does not touch the edge of bore 37 and is thus strain insulated from the platen. Four small commercial foil strain gages 39 such as Micro Measurement MA–06–062ED–120 and MA–06–062DF–120 gages, are bonded to the shaft 35 using a conventional adhesive such as W. T. Beans RP–43 adhesive. The gages are mounted in a conventional strain gage bridge configuration so as to obtain maximum output from the bridge when axial load is applied to the shaft through the disc. Electrical leads 41 are connected to the foil strain gages 39 and passed through an aperture 43 in the platen to a plug 45 for connection to a D.C. amplifier. Readout is obtained on a recording oscillograph.

In utilizing the invention, the specimen 17 can be cast and cured in place or bonded to the platen with a suitable material. In the case where a preformed specimen is bonded to the platens the stiffness and thickness of the bonding layer changes the sensitivity of the detector but this variable can be included in a calibration step. The bond layer does not affect the point of failure indication. An example of a bond material could be Minnesota Mining's EC1648. The platens are then pulled in opposite directions by an Instron tester. The load in the direction of the pull then appears across the specimen. This load varies from a minimum at the outside edge to a maximum at the center of the specimen. The materials tester load measuring device which, for example, could be an Instron load cell, senses the total load across the entire specimen. The load failure detector at the center senses only the load in its local area. In plotting the output from the Instron load cell simultaneously with that from the detection device 29, it is seen that the load from the load detector device 29 falls off considerably ahead of the overall load from the materials tester. This indicates the initial failure which occurs at the center of the specimen. Since the load failure device 29 sees only the load at the center and over a very small area, normally about one percent of the total area, an extremely small failure occurring at this location greatly affects the output from the device by reducing the load quite markedly. The failure initially is so small that it does not affect the overall load. Thus, the entire test specimen as a whole continues to load up as would be shown by the curve or trace produced by an Instron load tester that is also used. Thus, it is apparent that without indication from the device 29 it is impossible to determine the initial failure point. The load detector device 29 can be calibrated in terms of a load versus the trace deflection. By assuming that the load at any point along the load trace is uniformly distributed over the face of the disc 33, it is possible to calculate the local stress at the center of the disc by dividing the load by the area of the disc. This calculated stress is the maximum bond plane stress at the center.

The device has also been utilized to measure the cure characteristics of viscoelastic materials in triaxial tension. The technique is essentially the same as just discussed except the output from the load failure detector device is monitored during the cure of viscoelastic material at constant temperature. As the specimen cures up between the steel platens it tries to shrink. Small steel spacer rings placed between and at the edges of the platens prevent the specimen from shrinking and thus the material stresses up proportionally to its cure shrinkage.

The detector device of the invention can be utilized other than in the environment shown in the drawings. Rather than being mounted flush with the face of a platen used in a poker chip test as described, the device can be mounted in the walls of containers such as motor cases to which material is bonded. For example, when disposed in the motor case wall of a case bonded solid propellant grain, the device can measure the tensile or compressive stresses induced at the bond line between the motor case and the propellant grain.

Although the invention has been described and illustrated in detail, it is to be clearly understood that the same is by way of illustration and example only and is not to be taken by way of limitation, the spirit and scope of this invention being limited only by the terms of the appended claims.

I claim:
1. Apparatus for assisting in the investigation of the load failure properties of viscoelastic material, comprising;
    a platen formed with an opening,
    a flat disc inserted in the opening,
    a shaft affixed normal to one face of said disc,
    strain gages mounted on said shaft, and
    means for maintaining said flat disc in contact with the viscoelastic material to be investigated.

2. The structure according to claim 1 further comprising,
    a surface spaced from said disc, the viscoelastic material being disposed between and bonded to said disc and surface, and,
    means for moving the disc and surface away from one another to exert tension upon the viscoelastic material.

3. In an apparatus for detecting load failure in viscoelastic material comprising;
    a first platen,
    and a second platen wherein said viscoelastic material is bonded between said platens such when said platens are pulled oppositely a load is placed on said material,
    the improvement which comprises:
    a load failure detection device having a flat disc mounted flush in the face of one of said platens adjacent to said viscoelastic material, a shaft extending normal to said disc from the opposite side thereof that is for contact with said viscoelastic material,
    strain gages mounted on said shaft,
    and means securing said device to said platen whereby the disc portion is free to move according to the movement of said viscoelastic material.

4. The apparatus of claim 3 wherein said disc is disposed at the center of said platen.

5. The apparatus of claim 3 wherein said shaft of said device is affixed at the end opposite of said disc to a mounting apron which engages said platen securing said device to said platen.

6. The apparatus of claim 3 wherein there are four strain gages mounted on said shaft.

References Cited
UNITED STATES PATENTS 2,867,707    1/1959    MacDonald.
3,149,488    9/1964    Castro.

RICHARD C. QUEISSER, *Primary Examiner.*

J. H. WILLIAMSON, *Assistant Examiner.*